United States Patent
Harrison et al.

(10) Patent No.: US 7,516,079 B2
(45) Date of Patent: Apr. 7, 2009

(54) METHOD AND APPARATUS FOR INSURANCE RISK MANAGEMENT

(76) Inventors: Lance Harrison, 6090 N. Northcott Ave., Chicago, IL (US) 60631; Andrew Grant Harrison, 6090 N. Northcott Ave., Chicago, IL (US) 60631

( * ) Notice: Subject to any disclaimer, the term of this patent is extended or adjusted under 35 U.S.C. 154(b) by 1278 days.

(21) Appl. No.: 10/272,673

(22) Filed: Oct. 16, 2002

(65) Prior Publication Data

US 2003/0078817 A1 Apr. 24, 2003

Related U.S. Application Data

(60) Provisional application No. 60/329,915, filed on Oct. 16, 2001.

(51) Int. Cl.
*G06Q 40/00* (2006.01)
(52) U.S. Cl. ......................................................... 705/4
(58) Field of Classification Search ................. None
See application file for complete search history.

(56) References Cited

U.S. PATENT DOCUMENTS

2002/0156658 A1 * 10/2002 Selesny et al. ................. 705/4

OTHER PUBLICATIONS

Boyle, Phelim P., Mao, Jennifer. An Exact Solution for the Optimal Stop Loss Limit. The Journal of Risk and Insurance, vol. 50, No. 4 (Dec. 1983), pp. 719-726.*

* cited by examiner

*Primary Examiner*—Gerald J. O'Connor
*Assistant Examiner*—Sheetal R Rangrej
(74) *Attorney, Agent, or Firm*—Marshall, Gerstein & Borun LLP

(57) ABSTRACT

A methodology for calculating insurance premium comprising receiving a set of insurance information from a user including a revenue of the organization, a self insured retention (SIR) of the organization, and a loss limit acceptable to the organization to determine a standard premium for the organization. Once the standard premium of the organization is determined, the methodology illustrates how to determine a regular premium based on the standard premium and the SIR of the organization. Finally, using the described methodology one can determine an excess premium based on the loss limit acceptable to the organization, the regular premium and the self insured retention of the organization. The method provides a powerful tool to manage various risks of an organization and at the same time control various factors determining the insurance premium of the organization.

16 Claims, 14 Drawing Sheets

|  | Minor Insured | Major Insured |
|---|---|---|
| 16 → Insured's Revenue | $900,000,000 | $3,600,000,000 |
| 17 → Square Root | $30,000 | $60,000 |
| 18 → Multiple | 20 | 20 |
| 19 → Standard Premium | $600,000 | $1,200,000 |

(with column headers labeled 12 and 14 pointing to Minor Insured and Major Insured respectively)

|   |   | Minor Insured | Major Insured |
|---|---|---:|---:|
| 16 → | Insured's Revenue | $900,000,000 | $3,600,000,000 |
| 17 → | Square Root | $30,000 | $60,000 |
| 18 → | Multiple | 20 | 20 |
| 19 → | Standard Premium | $600,000 | $1,200,000 |

(12 ↓ above Minor Insured; 14 ↓ above Major Insured)

FIG. 1

|  | Minor 1 | Minor 2 | Minor 3 | Major 1 | Major 2 |
|---|---|---|---|---|---|
| Insured's Revenue | $900,000,000 | $900,000,000 | $900,000,000 | $3,600,000,000 | $3,600,000,000 |
| Insured's SIR | $250,000 | $500,000 | $1,000,000 | $2,500,000 | $5,000,000 |
| Log(SIR/a2) | -0.6021 | -0.301 | 0 | 0.3979 | 0.699 |
| Loss Limit (Policy Limit) | $25,000,000 | $25,000,000 | $25,000,000 | $25,000,000 | $25,000,000 |
| Log (Loss Limit) | 1.3979 | 1.3979 | 1.3979 | 1.3979 | 1.3979 |
| Retention Debit (or Credit) | -43.10% | -21.50% | 0.00% | 38.50% | 50.00% |
| Standard Premium (Minor Insured) | $600,000 | $600,000 | $600,000 | $600,000 | $600,000 |
| Regular Premium (Minor Insured) | $858,406 | $729,203 | $600,000 | $429,203 | $300,000 |
| Standard Premium (Major Insured) | $1,200,000 | $1,200,000 | $1,200,000 | $1,200,000 | $1,200,000 |
| Regular Premium (Major Insured) | $1,716,812 | $1,458,406 | $1,200,000 | $858,406 | $600,000 |

FIG. 2

|  | Minor |
|---|---|
| SIR | $1,000,000 |
| Regular Premium | $600,000 |
| Loss Limit | $25,000,000 |
| Log(Loss limit in millions) | 1.3979 |
| Experience Rated Limit (ERL) | $12,000,000 |
| SIR + ERL | $13,000,000 |
| Excess Limit | $12,000,000 |
| Log (SIR + ERL) | 1.1139 |
| Excess Limit Factor | 125.49% |
| Excess Premium | $152,968 |

FIG. 3

| MINOR INSURED | Minor 1 | Minor 2 | Minor 3 | Major 1 | Major 2 |
|---|---|---|---|---|---|
| Revenue | $900,000,000 | $900,000,000 | $900,000,000 | $3,600,000,000 | $3,600,000,000 |
| Loss limit | $25,000,000 | $25,000,000 | $25,000,000 | $25,000,000 | $25,000,000 |
| SIR | $250,000 | $500,000 | $1,000,000 | $2,500,000 | $5,000,000 |
| Regular Premium | $858,406 | $729,203 | $600,000 | $429,203 | $300,000 |
| ERL | $17,168,119 | $14,584,059 | $12,000,000 | $8,584,059 | $6,000,000 |
| SIR + ERL | $17,418,119 | $15,084,59 | $13,000,000 | $11,084,059 | $11,000,000 |
| Excess Limit | $7,581,881 | $9,915,941 | $12,000,000 | $13,915,941 | $14,000,000 |

FIG. 4A

| MINOR INSURED | Minor 1 | Minor 2 | Minor 3 | Major 1 | Major 2 |
|---|---|---|---|---|---|
| Revenue | $900,000,000 | $900,000,000 | $900,000,000 | $3,600,000,000 | $3,600,000,000 |
| Loss limit | $25,000,000 | $25,000,000 | $25,000,000 | $25,000,000 | $25,000,000 |
| SIR | $250,000 | $500,000 | $1,000,000 | $2,500,000 | $5,000,000 |
| Regular Premium | $1,716,812 | $1,458,406 | $1,200,000 | $858,406 | $600,000 |
| ERL | $34,336,237 | $29,168,119 | $24,000,000 | $17,168,119 | $12,000,000 |
| SIR + ERL | $34,586,237 | $29,668,119 | $25,000,000 | $19,668,119 | $17,000,000 |
| Excess Limit | ($9,586,237) | ($4,668,119) | - | $5,331,881 | $8,000,000 |

FIG. 4B

|  | Minor 1 | Minor 2 | Major 1 | Major 2 |
|---|---|---|---|---|
| Revenues | $900,000,000 | $900,000,000 | $3,600,000,000 | $3,600,000,000 |
| SIR | $500,000 | $1,000,000 | $1,000,000 | $2,500,000 |
| Standard Premium | $600,000 | $600,000 | $1,200,000 | $1,200,000 |
| Loss Limit | $25,000,000 | $25,000,000 | $25,000,000 | $25,000,000 |
| Retention Credit | 21.53% | 0.00% | 0.00% | -28.47% |
| Limit factor | 121.53% | 100.00% | 100.00% | 71.53% |
| Regular premium | $729,203 | $600,000 | $1,200,000 | $858,406 |
| Adjusted ERL | $15,000,000 | $12,000,000 | $24,000,000 | $17,000,000 |
| Adjusted (SIR+ERL) | $15,500,000 | $13,000,000 | $25,000,000 | $19,500,000 |
| Adjusted (Excess Limit) | $9,500,000 | $12,000,000 | - | $5,500,000 |
| Retrospective Base | 100% | 100% | 100% | 100% |
| Retrospective Term | 12 | 12 | 12 | 12 |
| Retrospective Calibrator | 50% | 50% | 50% | 50% |
| Retrospective Loss | $8,000,000 | $18,000,000 | $18,000,000 | $28,000,000 |
| Experience Rated Loss | $8,000,000 | $13,000,000 | $18,000,000 | $19,500,000 |
| Base Retrospective Factor | 76% | 100% | 90% | 100% |
| Loss Factor | 97% | 100% | 90% | 72% |
| Retrospective Premium Factor | 40% | 50% | 45% | 50% |
| Retrospective Premium | $292,208 | $300,000 | $538,767 | $429,203 |
| Regular + Retroactive Premium | $1,021,411 | $900,000 | $1,738,767 | $1,287,609 |
| Excess Premium | $178,146 | $229,452 | $ - | $107,702 |
| Total Premium | $1,199,557 | $1,129,452 | $1,738,767 | $1,395,311 |

FIG. 5

| INSURED's NAME > | ENTERPRISE RISK MINOR | RISK TRANSFER MINOR | | ENTERPRISE RISK MAJOR | RISK TRANSFER MAJOR |
|---|---|---|---|---|---|
| INSURED's REVENUE > | $ 900,000,000.00 | $ 900,000,000.00 | < DATA ENTRY > | $ 3,600,000,000.00 | $ 3,600,000,000.00 |
| INSURED's RETENTION & LIMITS | | | | | |
| RETENTION AMOUNT $ | $ 500,000.00 | $ 1,000,000.00 | < DATA ENTRY-S.I.R Selected by Insured > | $ 1,000,000.00 | $ 2,500,000.00 |
| EXPERIENCE RATED LIMIT | $ 15,000,000.00 | $ 12,000,000.00 | < =D8-D6 [(S.I.R.+E.R.L) -(S.I.R)] > | $ 24,000,000.00 | $ 17,000,000.00 |
| S.I.R + EXP. RATED LIMIT | $ 15,500,000.00 | $ 13,000,000.00 | =IF((ROUND(D14*20,-6)+D6)<25000000,ROUND(D14*20,-6)+D6,25000000) | $ 25,000,000.00 | $ 19,500,000.00 |
| EXCESS LIMITS | UNLIKELY | 12,000,000.00 | < =D10-D8 > | $ - | $ 5,500,000.00 |
| POLICY LIMIT | $ 15,500,000.00 | $ 25,000,000.00 | < POLICY LIMIT > | $ 25,000,000.00 | $ 25,000,000.00 |
| INSURER's RETRO FACTORS | | | | | |
| RETRO Indicator | BREAKEVEN > | BREAKEVEN > | Base Needed To | BREAKEVEN > | BREAKEVEN > |
| RETRO BASE % | 1 | 1 | As % of Regular | 1 | 1 |
| RETRO TERM | 12 | 12 | Max Yrs per Loss | 12 | 12 |
| RETRO Calibrator | 0.5 | 0.5 | Max % per Loss | 0.5 | 0.5 |
| INSURED's PREMIUMS | | | | | |
| STANDARD PREMIUM | $ 600,000.00 | $ 600,000.00 | < =20*SQRT(D3) > | $ 1,200,000.00 | $ 1,200,000.00 |
| RETENTION CREDIT % | -22% | 0% | =LOG(D6/1000000)/LOG(25) )/ (LOG 25) | 0% | 28% |
| REGULAR PREMIUM > | 729,202.97 | 600,000.00 | =(D20)(1-D21) [Std Premium*Reciprocal of Retention Cre | 1,200,000.00 | 858,405.93 |
| RETRO PREMIUM FACTOR | 92% | 82% | From Table B Total below | 70% | 48% |
| RETRO PREMIUM > | 671,271.92 | 489,637.25 | Retro Premium Factor * Regular Premium*Retro B | 840,990.18 | 413,034.98 |
| REGULAR & RETRO PREMIUM > | $ 1,400,474.89 | $ 1,089,637.25 | < SUBTOTALS > | $ 2,040,990.18 | $ 1,271,440.91 |
| EXCESS PREMIUM indication | UNLIKELY | 277,799.89 | < INDICATIONS > | - | 106,350.12 |
| PREMIUM TOTAL | $ 1,400,474.89 | $ 1,367,437.14 | < TOTALS > | $ 2,040,990.18 | $ 1,377,791.04 |
| A: LOSSES & LIMITS | PRIOR YEAR LOSSES | | A: LOSSES & LIMITS | | |
| Prior Year Loss | Enter amounts below | Enter amounts below | | Enter amounts below | Enter amounts below |
| 1st Loss > | $ 18,000,000.00 | $ 18,000,000.00 | See Rtention Trust Exhibits | $ 18,000,000.00 | $ 18,000,000.00 |
| 2nd Loss > | $ 2,300,000.00 | $ 2,300,000.00 | See Rtention Trust Exhibits | $ 2,300,000.00 | $ 2,300,000.00 |
| 3rd Loss > | $ 2,200,000.00 | $ 2,200,000.00 | See Rtention Trust Exhibits | $ 2,200,000.00 | $ 2,200,000.00 |
| TOTAL | $ 22,500,000.00 | $ 22,500,000.00 | < TOTALS > | $ 22,500,000.00 | $ 22,500,000.00 |
| B: LOSSES & PREMIUMS | CURRENT YEAR PREMIUMS | | B: LOSSES & PREMIUMS-RETRO FACTORS | | |
| LOSS | LOSS FACTOR 1 | LOSS FACTOR 1 | PRIOR YR EXPERIENCE RATED LOSSES > CURRENT YEAR RETROSPECTIVE PREMIUM FACTORS | LOSS FACTOR 1 | LOSS FACTOR 1 |
| 1st Loss > | 50% | 50% | | 45% | 48% |
| 2nd Loss > | 21% | 16% | | 13% | 0% |
| 3rd Loss > | 21% | 15% | | 12% | 0% |
| TOTAL | 92% | 82% | | 70% | 48% |
| B: LOSSES & PREMIUMS | | | B: LOSSES & PREMIUMS-RETRO PREMIUMS | | |
| | $ 364,601.48 | $ 300,000.00 | 1st Loss > $18,000,000 | $ 538,766.68 | $ 413,034.98 |
| | $ 155,767.96 | $ 97,418.20 | 2nd Loss > $ 2,300,000 | $ 155,254.66 | $ - |
| | $ 150,802.47 | $ 92,219.06 | 3rd Loss > $ 2,200,000 | $ 146,968.83 | $ - |
| | $ 671,271.92 | $ 489,637.25 | TOTALS to RETRO PREMIUM | $ 840,990.18 | $ 413,034.98 |

FIG. 7

| SUMMARY COMPARISON -10 YEAR TERM | RETENTION TRUST | RETENTION TRUST | SUMMARY COMPARISON -10 YEAR TERM    SINGLE INSURED | BANKING EXCESS | RETENTION TRUST |
|---|---|---|---|---|---|
| CATEGORY | RETRO BASE before adjustm | RETRO BASE after adjustm | RETRO BASE is the per cent applied to Regular Premium so Premium "Breaks even" with incurred claims and expenses. | RETRO BASE after adjustm | INCREASE (DECREASE) |
| INSURED: | MAJOR | MAJOR | | MAJOR | MAJOR |
| INSURED's REVENUE: | $ 3,600,000,000 | $ 3,600,000,000 | | $ 3,600,000,000 | $ - |
| RETENTION & LIMITS | STRUCTURE | STRUCTURE | | STRUCTURE | STRUCTURE |
| RETENTION $ | $ 1,000,000 | $ 1,000,000 | | $ 1,000,000 | $ - |
| EXP. RATED LIMIT | $ 24,000,000 | $ 24,000,000 | | $ 24,000,000 | $ - |
| S.I.R + EXP. RTD. LIMIT | $ 25,000,000 | $ 25,000,000 | < Enterprise Risks included within this Limit >   Risk Transfer in Excess Limit must be fortuitous | $ 25,000,000 | $ - |
| EXCESS LIMITS | $ - | $ - | | $ - | $ - |
| POLICY LIMIT | $ 25,000,000 | $ 25,000,000 | | $ 25,000,000 | $ - |
| RETRO FACTORS | RETRO Factors | RETRO Factors | | RETRO Factors | RETRO Factors |
| RETRO Indicator | 134.2% | 102.2% | Indicated RETRO BASE per cent after entering the previous Retro Indicator Retro of 134.2% as the Retro Base %. The resulting Retro Indicator should then be 100.0%  [Is 102.2%] | 102.2% | 0% |
| RETRO BASE % | 100% | 134.2% | RETRO BASE changed to correspond to RETRO Indicator % | 135.4% | 1.2% |
| RETRO TERM | 12 | 12 | | 12 | 0.0% |
| RETRO Calibrator | 100% | 100% | | 100% | 0.0% |
| INSURED's PREMIUMS | PREMIUMS | PREMIUMS | | PREMIUMS | PREMIUMS |
| STD. PREMIUM | $ 12,000,000 | $ 12,000,000 | | $ 12,000,000 | $ - |
| S.I.R. CREDIT / DEBIT | 0.0% | 0.0% | | 0.0% | 0.0% |
| REGULAR PREMIUM | $ 12,000,000 | $ 12,000,000 | | $ 12,000,000 | $ - |
| RETRO PREMIUM | 209.3% | 280.9% | | 283.4% | 2.5% |
| RETRO PREM. | $ 25,118,270 | $ 33,706,035 | 134.2% more Retro Premium due to change in RETRO BASE | $ 34,007,430 | $ 301,395 |
| REGULAR & RETRO > | $ 37,118,270 | $ 45,706,035 | | $ 46,007,430 | $ 301,395 |
| EXCESS PREM. | $ - | $ - | Risk Transfer in Excess Limit must be fortuitous | $ - | $ - |
| PREMIUM TOTAL | $ 37,118,270 | $ 45,706,035 | indicated RETRO BASE per cent after entering the previous Retro Indicator Retro of 134.2% as the Retro Base %. The resulting Indicated base should then be 100% | $ 46,007,430 | $ 301,395 |
| EXP. RATED LOSSES- Incurred Claims within 10 year term | $ 57,137,289 | $ 57,137,289 | EXP. RATED LOSSES: 10 year totals are shown for 16 losses greater than $1,000,000 entered in Simulation Exhibit. | $ 57,137,289 | $ - |
| RETENTION TRUST | | | | | |
| EXPENSES-Fixed | $ (500,000) | $ (500,000) | | $ (1,000,000) | $ (500,000) |
| EXPENSES-Variable | $ - | $ - | | $ (4,600,743) | $ (4,600,743) |
| EXPENSE TOTAL | $ (500,000) | $ (500,000) | | $ (5,600,743) | $ (5,100,743) |
| EXP. RATED LOSSES- PAYOUT Claims within 10 years. | $ (50,687,289) | $ (50,687,289) | CLAIMS-CASH FLOWS; EXP. RATED LOSSES- PAYOUT Claims within 10 years. | $ (57,137,289) | $ (6,450,000) |
| BEGINNING BALANCE | $ 25,000,000 | $ 25,000,000 | TRUST INVESTMENT BALANCES-10 YEAR SUMMARY | $ 25,000,000 | $ 25,000,000 |
| REGULAR PREMIUM > | $ 12,000,000 | $ 12,000,000 | | $ 12,000,000 | $ - |
| RETRO PREMIUM > | $ 25,118,270 | $ 33,706,035 | < $8,589,764 Increase in Retro Premium or 34.2% | $ 34,007,430 | $ 301,395 |
| BALANCE | $ 62,118,270 | $ 70,706,035 | | $ 71,007,430 | $ 301,395 |
| INTEREST INCOME | $ 6,646,753 | $ 7,817,372 | < $1,170,619 Increase in Investment Income | $ 7,258,680 | $ (558,691) |
| EXPENSE & CLAIMS PAID | $ (51,187,289) | $ (50,687,289) | | $ (57,137,289) | $ (6,450,000) |
| ENDING BALANCE- Investments | $ 17,575,734 | $ 27,336,117 | < $9,760,683 increase in ENDING BALANCE | $ 21,128,821 | $ (6,207,296) |
| | RETENTION TRUST Before Base Adjustment | RETENTION TRUST After Base Adjustment | | BANKING EXCESS After Base Adjustment | BANKING EXCESS vs RETENTION TRUST Favorable (Adverse) |
| EXPENSES-Fixed | $ 500,000 | $ 500,000 | < Assumes $50,000 annually / Assumes $100,000 annually > Assumes Variable Expenses of 10% of Premium > | $ 1,000,000 | $ (500,000) |
| EXPENSES-Variable | $ - | $ - | | $ 4,600,743 | $ (4,600,743) |
| Expense & Profit | $ 500,000 | $ 500,000 | | $ 5,600,743 | $ (5,100,743) |
| Investment income | $ (6,646,753) | $ (7,817,372) | Assumes 3% Interest Rate | $ (7,258,680) | $ (558,691) |
| Expense and Income | $ (6,146,753) | $ (7,317,372) | Net Reduction due to assumed higher expenses | $ (1,657,937) | $ (5,659,434) |
| RETRO PREMIUM > | | | Net Increase to offset assumed higher expenses | $ | $ (547,862) |
| | | | ENDING BALANCE-Investments | | $ (6,207,296) |

FIG. 8

| DESCRIPTION | INSURANCE | RETENTION TRUST ENTERPRISE RISK | RETENTION TRUST RISK TRANSFER | BANKING EXCESS | INEXCHANGE CAPTIVE | COMMENTS |
|---|---|---|---|---|---|---|
| Indemnity Source | Commercial Insurer (s) | Revolving Fund-through a Trust, Captive Insurer or Protected Cell program | < SAME But can also incorporate insurance | Insurer Sponsored Insurance Plan | Insurer Sponsored Inter-Industry Captive Insurance Company | |
| Underwriting | Prospective premiums based on subjective estimates of exposure as modified by | Retrospective premiums based on incurred losses provide an objective experience based | < SAME But can also incorporate insurance | < SAME > | Retrospective premiums based on incurred losses provides an objective experience based | Simple, transparent and objective |
| Control | Insurer and re-insurers | Insured 100% | Insured and Insurer | Insured and Insurer | Insured and Insurer | |
| Document | Insurance Policy | Trust Document or Insurance Policy | Trust Document or Insurance Policy | Insurance Policy | Insurance Policy | |
| A. Retention | Negotiated through Insured's broker with Insurer(s) | Set by Insured- likely to be constant once established. | Set by Insured- likely to be constant once established. | Set by Insured. Can be changed annually | Set by Insured. Can be changed annually | |
| B. Premiums | Negotiated through Insured's broker with Insurer(s) | Set by Insured- subject to retention selection and retro premiums for incurred | Insured and Insurer | Insurer sets within agreed parameters. | Insured and Insurer | |
| C. Retro Indicator | Not Applicable | Computed by model for single Insured | Computed by model for single Insured | Computed by model for single Insured | Computed by model for each and all Insureds | Retro Premium Base needed to Break-even |
| D. Retro Premium Base | Not Applicable | Set by Trust Administrator per Insured's Instructions | Set by Trust Administrator per Insured's Instructions | Insurer sets within agreed parameters. | Set by Insurer | % Factor applied to Regular Premium for Retro Premium calculation |
| E. Retro Term | Not Applicable | Set by Trust Administrator per Insured's Instructions | Set by Trust Administrator per Insured's Instructions | Insurer sets within agreed parameters. | Set by Insurer | Maximum Retro term needed for a single Limit Loss. |
| F. Retro Calibrator | Not Applicable | Computed by model for single Insured | Computed by model for single Insured | Computed by model for single Insured | Computed by model for each and all Insureds | Maximum Retro premium increase permitted for Limit Loss. |
| Premium reflects | Industry experience, investment outlook, | Insured's SIR selections and loss experience | Insured's SIR selections and loss experience | Insured's SIR, losses; Insurer's retro factors | Insured's SIR selections, its losses and changes in the Insurer's retro factors | |

FIG. 9A

| DESCRIPTION | INSURANCE | RETENTION TRUST ENTERPRISE RISK | RETENTION TRUST RISK TRANSFER | BANKING EXCESS | INEXCHANGE CAPTIVE | COMMENTS |
|---|---|---|---|---|---|---|
| Capital requirements | None | Insurance limits are 100% funded by Insured | Experience rated limits are funded by Insured. Excess limits by Insurer | Negotiable | Capital requirement of up to 2X's premium per Insured. | |
| Duration | Short term risk transfer-generally one year | Long term loss transfer in a multi-year program. | Long term loss transfer in a multi-year program. | Long term: multi-year program. | Long term loss transfer in a multi-year program. | |
| Risk Transfer | Yes | No-spreads loss over years. | Yes-spreads loss over years + Excess Limits | No-spreads loss over years. | Yes-spreads loss over years + Excess Limits | |
| Loss Requirements | Losses must be definite in time, place & amount. Fortuitous & not subject to catastrophic events | Losses must be definite in time, place & amount. Losses do not have to be fortuitous & can be subject to catastrophic events | Losses must be definite in time, place & amount. Losses must be fortuitous & not subject to catastrophic events | Negotiable | Losses must be definite in time, place & amount. Losses must be fortuitous & not subject to catastrophic events | |
| Loss Limits | Per Loss and in the Aggregate per year | Per Loss and in the Aggregate per year | Per Loss and in the Aggregate per year | Negotiable | Per Loss subject to an All Years Aggregate. | |
| Stability | Unstable, volatile | Predictable-Finite Risk Plan | Predictable-Finite Risk Plan | Predictable-Finite Risk Plan | Predictable-Finite Risk Plan | |
| Financial Strength | Good=s $2 premium to $1 of PHS [capital] for a conventional insurer. | Superior=Full funding of policy limit. Recourse to Parent | Superior=Full funding of experience rated limit. Recourse to Parent | Dependent on Insurer's financial strength | Excellent=$1 premium to $2 of capital or 4 X's stronger than conventional insurer. | |
| Plan Asset Ownership | General assets - commercial Insurer | Trust Assets-Controlled by Insured [Beneficiary] | Trust Assets-Controlled by Insured [Beneficiary] | General assets - commercial Insurer | Captive Insurer's general assets-Insured's premium deposit serves as equity | |
| Efficiency Rank Estimate: 1=Best 5=Worst | 5th-Property/Casuality Insurers have 35-40% expense ratios vs. 5% for employee benefits. Industry has had an 80 yr net underwriting loss | 1st-Expenses should be less than 5% of premium: No sales charges; No insurance costs; Low unallocated loss adjustment costs. | 2nd-Expenses should be more than 5% of premium reflecting sales charges and insurance costs. | 4th-Banking Excess Plans are currently a specialty market and little is known about such Plans. | 3rd-Group captives have historically had low operating expenses. | |
| Net Income | Earned for shareholders can be distributed to owners as dividends. | Earned by Trust, can be distributed to Insured as owner and beneficiary. | Earned by Trust, can be distributed to Insured as owner and beneficiary. | Negotiable-but likely retained by Insurer | Earned by Insurer, but can be distributed as dividends or premium credits. | |
| Termination Effect | None-except coverage loss. | Insured can recover assets. Trust may retain liabilities. | Insured can recover assets. Trust may retain liabilities. | Insured subject to all years aggregate loss limit and possible capital loss. | Insured subject to all years aggregate loss limit and possible capital loss. | |

| LOSS No | SIR + EXP RTD LIMIT | LOSS FACTOR | | | | | | | | | | |
|---|---|---|---|---|---|---|---|---|---|---|---|---|
| 3.02 | $ 3,500,000 | 51.66% | | | | | $622,553 | $622,553 | $622,553 | $555,271 | | |
| 4.01 | $ 3,500,000 | 51.66% | | | | | | $622,553 | $622,553 | | | |
| 4.02 | $ 1,010,000 | 0.41% | | | | | | $153 | | | | |
| 5.01 | $ 25,000,000 | 133.30% | | | | | | | $1,599,600 | $1,599,600 | $1,599,600 | |
| 5.02 | $ 1,200,000 | 7.56% | | | | | | | $51,319 | | | |
| 6.01 | $ 1,750,000 | 23.17% | | | | | | | | $278,098 | $225,387 | |
| 6.02 | $ 1,100,000 | 3.96% | | | | | | | | $14,024 | | |
| 7.01 | $ 7,500,000 | 83.44% | | | | | | | | | $1,001,293 | $1,001,293 |
| 8.01 | $ 7,050,000 | 60.86% | | | | | | | | | | $970,545 |
| 9.01 | $ 7,500,000 | 83.44% | | | | | | | | | $1,001,293 | $1,001,293 |
| 10.10 | $ 5,000,000 | 66.66% | | | | | | | | | | |
| TO RETRO PREMS | $ 89,137,289 | | | | | | $2,254,243 | $2,409,288 | $2,485,799 | $2,681,610 | $4,332,376 | $4,505,898 | $4,797,904 | $5,007,790 | $5,979,559 |

10: RETROSPECTIVE PREMIUMS INCURRED BY YEAR

| LOSS No | SIR + EXP RTD LIMIT | LOSS FACTOR | DURATION - YEARS | 1.00 | 2.00 | 3.00 | 4.00 | 5.00 | 6.00 | 7.00 | 8.00 | 9.00 | 10.00 |
|---|---|---|---|---|---|---|---|---|---|---|---|---|---|
| 1.01 | $ 1,127,289 | 4.96% | 0.37 | $22,163 | | | | | | | | | |
| 1.02 | $ 2,200,000 | 32.66% | 2.45 | $959,753 | | | | | | | | | |
| 1.03 | $ 2,300,000 | 34.45% | 2.59 | $1,071,021 | | | | | | | | | |
| 1.04 | $ 18,000,000 | 119.70% | 6.96 | $12,897,643 | | | | | | | | | |
| 2.01 | $ 1,400,000 | 13.97% | 1.06 | | $174,784 | | | | | | | | |
| 3.02 | $ 3,500,000 | 51.66% | 3.89 | | | $2,422,929 | | | | | | | |
| 4.01 | $ 3,500,000 | 51.66% | 3.89 | | | | $2,422,929 | | | | | | |
| 4.02 | $ 1,010,000 | 0.41% | 0.03 | | | | $153 | | | | | | |
| 5.01 | $ 25,000,000 | 133.30% | 10.00 | | | | | $15,996,000 | | | | | |
| 5.02 | $ 1,200,000 | 7.56% | 0.57 | | | | | $51,319 | | | | | |
| 6.01 | $ 1,750,000 | 23.17% | 1.74 | | | | | | $483,485 | | | | |
| 6.02 | $ 1,100,000 | 3.96% | 0.30 | | | | | | $14,024 | | | | |
| 7.01 | $ 7,500,000 | 83.44% | 6.25 | | | | | | | $6,267,744 | | | |
| 8.01 | $ 7,050,000 | 60.86% | 6.07 | | | | | | | | $5,888,704 | | |
| 9.01 | $ 7,500,000 | 83.44% | 6.25 | | | | | | | | | $6,267,744 | |
| 10.10 | $ 5,000,000 | 66.66% | 6.00 | | | | | | | | | | $3,999,000 |
| | $ 89,137,289 | 787.33% | 59.44 | $14,950,581 | $174,784 | $2,422,929 | $2,423,082 | $16,047,319 | $497,509 | $6,267,744 | $5,888,704 | $6,267,744 | $3,999,000 |
| RETRO INCURRED | | | | | | | | | | | | | $ 3,999,000 |

METHOD AND APPARATUS FOR INSURANCE RISK MANAGEMENT

CROSS-REFERENCE TO RELATED APPLICATIONS

This application claims priority to U.S. Provisional Application Ser. No. 60/329,915, entitled, "Method of Risk Transfer and Loss Funding," filed Oct. 16, 2001, the disclosure of which is hereby expressly incorporated herein by reference.

TECHNICAL FIELD

The present patent relates generally to computer software, and more particularly, to a computer software for managing insurance risk.

BACKGROUND ART

Insurance programs are used to protect against an uncertain need to fund a future liability of an uncertain value, for example, a need to replace a car or a home in case of its loss or a need to provide a source of income in case of disability or death, etc. To provide an insurance again such uncertain events, an insurer generally evaluates future expected losses of an insured to determine an insurance premium to be charged for such an insurance coverage. However, it is not always possible to ascertain the future expected losses of an insured entity. Often, insurers estimate future expected losses of an insured entity based on past experiences of the insured entity. In other situations, the expected future losses may also be determined based on some other indices that may be correlated to such future expected losses.

One type of insurance widely used by various entities in the United States is a commercial liability insurance. Such an insurance is generally used to compensate an a business for a wide variety of losses incurred by an insured entity, which may include losses due to natural disasters, tort claims, etc. To estimate future expected losses for this type of insurance, an insurer may look at the past history of claims against the insured entity, and use an average of the past claims as a guide for the future claims. Alternatively, an insurer may also look at similar claims by other organization in an industry to determine the expected future losses. An insurer may use a number of much more sophisticated models using a number of different criteria. In practice, a lot of times insurers decide the pricing of premiums for such liability insurance based on the market demand and supply.

In an alternate arrangement for insuring against expected future losses, an organization may also use a self-insurance model in which, the insured entity may set aside a certain reserve in a separate fund that will be used to make any payments against future expected losses incurring to that organization. One advantage of using such a self insurance program is a removal of an intermediary such as an insurance company, and hence reduction in the cost of obtaining such an insurance. Self-insurance programs are particularly popular among governmental and not-for-profit entities for several reasons. For example, such governmental entities are generally tax exempt, and hence they do not derive the benefit of tax deductible insurance payments. Secondly, some governmental organizations have large reserves on their balance sheet, or they have access to bond markets to fund an internal self-insurance fund.

In recent years, changes in law, claims handling, managed health care, computers, etc., have changed the economics of self insuring versus insuring liabilities through an insurer. Numerous public and private entities are reviewing the cost and effectiveness of their current insurance and self-insurance programs. In many states, private insurers have historically been prohibited from writing insurance coverage for public entities. Due to such restrictions, a governmental organization looking to insure itself against expected future losses may use a self insurance program either by itself or in partnership with other governmental institutions.

BRIEF DESCRIPTION OF THE DRAWINGS

The present patent is illustrated by way of examples and not limitations in the accompanying figures, in which like references indicate similar elements, and in which:

FIG. 1 is an exemplary illustration of a worksheet used in determination of a standard premium of an insured entity;

FIG. 2 is an exemplary illustration of a worksheet used in determination of a regular premium of an insured entity;

FIG. 3 is an exemplary illustration of a worksheet used in determination of an excess premium of an insured entity;

FIGS. 4A and 4B are exemplary illustrations of worksheets used in determination of excess limits for an insured entity;

FIG. 5 is an exemplary illustration of a worksheet specifying an interactive model used to determine a retrospective premium of an insured entity;

FIG. 7 shows a worksheet highlighting financial structures of two different methods of arranging a retention trust program;

FIG. 8 shows a 10 year summary comparison of retention trust and a banking excess program for a single insured entity;

FIGS. 9A and 9B shows a comparison matrix of various risk management methods described in here; and FIGS. 10A-10D shows results of a simulation of the risk management methods described in here using a retention trust approach.

DESCRIPTION OF THE EMBODIMENTS

Figure 6:
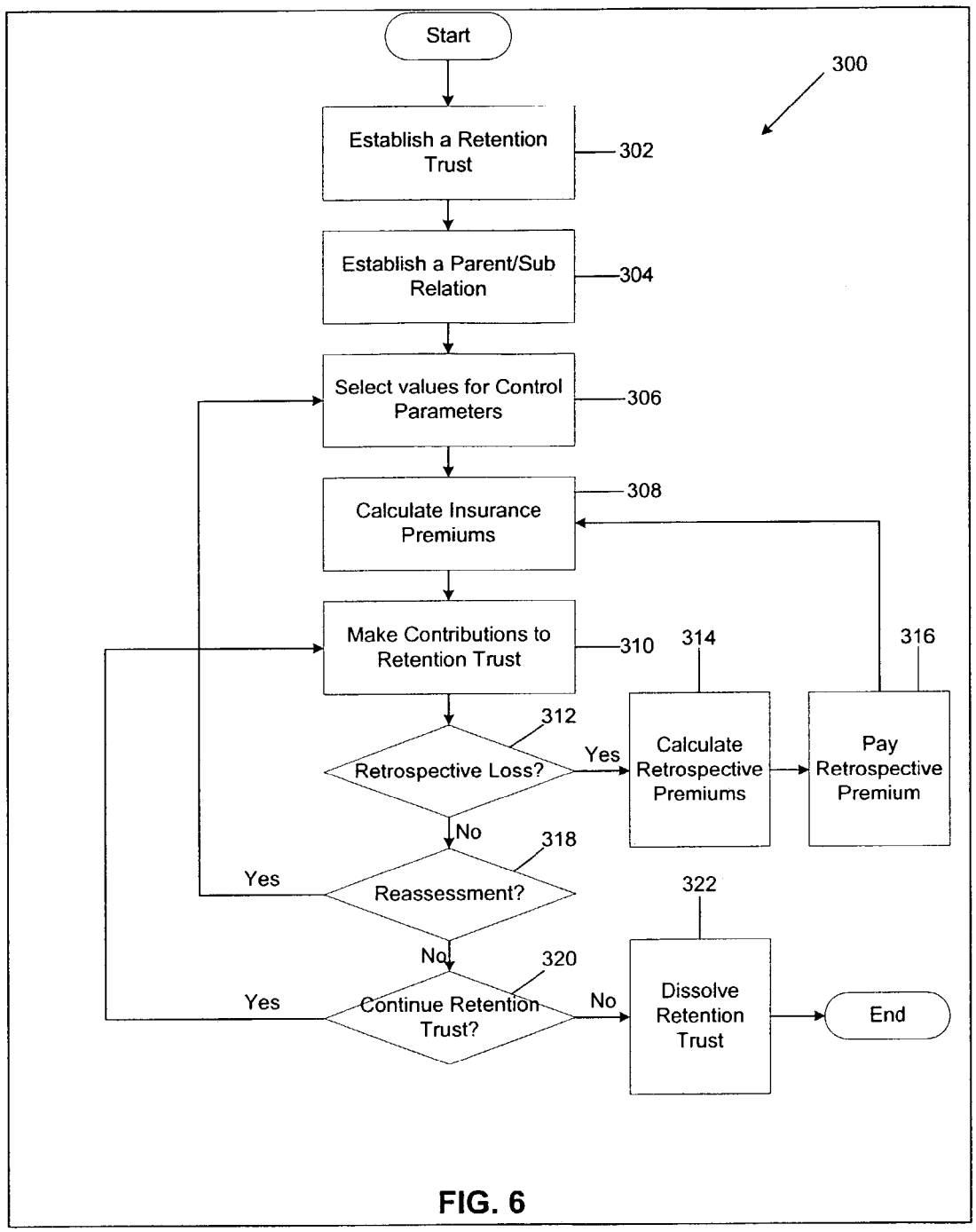
FIG. 6 shows an exemplary flowchart to use a retention trust program in an enterprise risk model.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

While in the following, a method of managing an insurance risk of an entity is described using a number of worksheets, it can be understood that an alternate tool can be used to implement the described method. For example, in an alternate implementation, the method described below can be implemented using a set of graphical user interface (GUI) templates, where each of the template may interact with one or more input and output mechanism, such as a computer keyboard, calculator keyboard, etc., and where one or more input can be provided to the template, and where the template may show the results of a routine attached to such a template, on a display device such as a monitor, etc. The worksheets described in the following figures can be implemented using any of the standard worksheet programs such as Excel, etc.

FIG. 1 is an exemplary illustration of a worksheet 10 used to determine a standard premium of an insured entity. A standard premium of an insured entity is a premium based on a level of revenues of the insured entity. The exemplary illustration of FIG. 1 illustrates a calculation of a standard premium that is revenue based, such that it is based on a reasonable approximation of an insured's exposure to losses in relation to its size. It is assumed that an insured's capacity to bear loss and risk exposure increases with size but that this relationship is not linear i.e., an insured's exposure to risk that can be covered by an insurance premium is exponentially related to the such an insurance premium and that such risk is linearly related to its revenues. Therefore, if the insurance premium of an insured is increased by two-fold, the revenue size, and hence the risk exposure covered by such an increase in the insurance premium will be four-fold. Such a relation between standard premium and the revenues of the insured can be depicted by an equation 1 given below.

$$\text{std\_prem} = a1 * \sqrt{\text{revenues}} \quad (1)$$

where a1 is an limit to premium multiplier, and std_prem is the standard premium. The standard premium is a reference point for determining a regular premium for the inured entity. The exemplary worksheet in FIG. 1 shows this relation between the revenue of an insured entity and the standard premium of the insured entity for a minor insured entity in column 12 and for a major insured entity in column 14. As shown in column 12 the revenues of the minor insured entity are $900,000,000 while the revenues of the major insured entity are $3,600,000,000, as shown in row 16. As shown in row 17, the square roots of these revenues are $30,000 and $60,000 respectively. The limit to premium multiplier a1 used in the exemplary worksheet of FIG. 1 is 20, as shown in row 18. However, it will be clear to one of ordinary skill in the art that in an alternate implementation of the present invention, the limit to premium multiplier a1 may be any reasonable number other than 20. Multiplying the square roots of the revenues from row 17 with the limit to premium multiplier a1 of row 18, the standard premium of the minor entity is obtained to be equal to $600,000 and the standard premium of the major insured entity is obtained to be equal to $1,200,000, as shown in row 19.

As can be seen from this exemplary illustration, in the method used to determine a standard premium, as described in FIG. 1, when the revenues of the insured entity increases four-fold, the standard premium required to cover the loss of risk increases by two-fold. Please note that while the method of calculating standard premium as depicted in FIG. 1 and illustrated by Equation 1 relates the standard premium of the insured entity to the revenues on a second degree of exponential relation, in an alternate implementation, the relation may be based on an alternate degree of exponential relation.

It can be seen that the relation between the revenues and the standard premium, as depicted in FIG. 1 can also be alternatively used in reverse to see what level of revenues will a given standard premium support. Alternatively, the revenues of an insured entity may be weighted by a weighting factor greater to account for risk level related to such revenues, where the risk weighting factor is above 1 for high-risk revenues such as hazardous material transportation or where the risk factor is below 1 for low-risk level related to such revenues such as city school, etc. It is important to note that the method of calculating a standard premium of an insured entity, as depicted in FIG. 1 allows one to calculate a standard premium which is based on only the revenues of such an insured entity.

FIG. 2 is an exemplary illustration of a worksheet 30 used to determine a regular premium of an insured entity. A regular premium of an insured entity is the standard premium of the insured entity adjusted for a self insured retention (SIR) of the insured entity and a retention debit or credit (hereinafter referred to as "retentions debit"). The exemplary illustration of FIG. 2 illustrates calculation of a regular premium of the insured entity based on its standard premium as calculated in FIG. 1 and the retention debit as given by an equation 2 given below:

$$\text{retention\_debit} = \frac{\log(SIR/a2)}{\log(\text{loss\_limit}/a2)} \quad (2)$$

where retention_debit is the retention debit of the insured entity, loss_limit is a loss limit acceptable to the insured entity (a loss limit is also known as a policy limit). Here a2 is a multiplier used to adjust the value of the SIR into millions, i.e., a2 has a value of $1,000,000.

The regular premium of insured entity is calculated using an equation 3 given below:

$$\text{reg\_prem} = \text{std\_prem} * (1 - \text{retention\_debit}) \quad (3)$$

where reg_prem is the regular premium of the insured entity and the std_prem is the standard premium of the insured entity as calculated by equation 1 above. The regular premium of the insured entity determines the insured entity's experience rated limit, which is described in further detail below. The regular premium of the insured entity also works as a reference point for calculating a retrospective premium for experience rated losses of the insured entity in excess of its SIR but within its experience rated limit.

The exemplary worksheet in FIG. 2 shows this relation between the standard premium, the SIR, the retention debit and the regular premium of the insured entity. In FIG. 2, columns 32, 34 and 36 shows a determination of the regular premium for a minor insured entity for various levels of revenues, while columns 38 and 40 shows a determination of the regular premium for a major insured entity for various levels of revenues. Row 42 lists the revenues for various insured entities in various columns, row 44 lists the SIR for various insured entities, row 46 lists logarithms (hereinafter referred to as log) of various SIRs listed in row 44 adjusted by a2 to convert them in millions. As shown in row 48 of FIG. 2, the loss limits for all the insured entities are supposed to be at $25,000,000 level, however, it is understood that a user can select a different level of loss limit for the insured entities. Row 50 shows a log of loss limits from row 48 with the loss limits adjusted in millions. using the log of SIR from row 46 and dividing it by the log of loss limit from row 48, the spreadsheet finds a retention debit for the insured organization as shown in row 52. Row 54 lists the standard premiums of the insured entities based on the revenues in row 42 and calculated using the equation 1 described above when the minor entity in insured. Based on the standard premiums listed in row 54, the regular premiums for the insured entities, when the minor entity is insured, are listed in row 56. Similarly, row 58 lists the standard premiums of the insured entities based on the revenues in row 42 and calculated using the equation 1 described above when the major entity in insured. Based on the standard premiums listed in row 58, the regular premiums for the insured entities, when the major entity is insured, are listed in row 60.

The worksheet shown in FIG. 2 allows a user to calculate regular premiums for various insured entities by inputting various values of revenues, loss limits and SIRs for such an insured entity. When an insurer is dealing with more than one insured entities in a risk management pool and only one of them is to be insured, the worksheet illustrated in FIG. 2 allows an insurer to adjust the regular premiums based on which of the insured entity needs to be insured.

For example looking at column 32 in FIG. 2, for a revenue level of $900,000,000, the regular premium for the insured entity Minor 1 is $858,406, as seen in row 56, when a minor entity with a revenue of $900,000,000 is insured. While the regular premium is $1,716,812, as seen in row 60, when the major entity with a revenue of $3,600,000,000 is insured. It should be noted in row 52 that when the SIR of the insured entity is less than $1,000,000, a retention debit (depicted by the negative values in column 32 and 34) is applied to the standard premium of the insured entity, whereas when the SIR is greater than $1,000,000, a retention credit (depicted by the positive values in column 38 and 40) is applied to the standard premium of the insured entity. At an SIR of $1,000,000, there is no retention debit or credit (as depicted by a value of 0 in column 36). This allows an insured entity to control its risk level by selecting a higher or lower level of SIR. The method used to calculate the regular premium results in higher regular premium for a lower level of SIR due to the application of retention debit, and a lower level of regular premium due to the application of a retention credit.

FIG. 3 is an exemplary illustration of a worksheet 70 used in determination of an excess premium of an insured entity. An excess premium is the amount of premium an insured entity may have to pay to be insured in addition to its SIR and an experience rated limit (ERL) of the insured entity. Experience rating of an insured entity involves using an insured's own loss experience to estimate expected future losses of the organization. A number of different methods may be employed to estimate the experience rated limit of an insured entity. In the exemplary embodiment illustrated in FIG. 3, the experience rated limit is estimated based on the revenue of the insured entity. Since the standard premium of the insured entity is calculated using the revenues of the insured entity, in the exemplary illustration of FIG. 3, the experience rated limit is calculated using the standard premium of the insured entity using an equation 4 given below:

$$\text{exp\_rated\_limit} = a1 * \text{reg\_prem} \quad (4)$$

where exp_rated_limit is the experience rated limit of the insured entity.

An excess limit factor calculated based on the experience rated limit, the loss limit and the SIR of the insured entity indicates by what amount the regular premium of the insured entity needs to be adjusted to calculate an excess premium. The excess limit factor is calculated by using an equation 5 given below:

$$\text{excess\_limit\_factor} = \left( \frac{\log(\text{loss\_limit}/a2)}{\log(\text{exp\_rated\_limit}/a2)} - a3 \right) \quad (5)$$

Where excess_limit_factor is the excess limit factor and a3 is a constant with an approximate value of 1. The exemplary worksheet 70 of FIG. 3 shows the relation between the regular premium, the experience rated limit and the loss limit for a major insured entity. The column 71 of FIG. 3 contains various parameters for a major insured entity. Row 72 specified the SIR that the major insured entity is willing to accept to be $1,000,000, row 73 specifies the regular premium of the major insured entity as $ 1,000,000 (as calculated above in FIG. 2 in row 60 and column 40). Row 74 specifies that the loss limit acceptable to the major insured entity in this case is $25,000,000, row 75 shows the log of the loss limit, as inputted in row 74 and converted into millions, to be equal to 1.3979 and row 76 shows the ERL of the major insured entity, as calculated by equation 4. In the case of the major insured entity described in FIG. 3, the sum of the SIR and the ERL is equal to $13,000,000 as shown in row 77, subtracting this sum of the SIR and the ERL from the loss limit, the excess limit is obtained to be equal to $12,000,000, as shown in row 78. Row 79 shows the log of the sum of the SIR and the ERL converted into millions to be equal to 1.1139. The ratio of the log of the loss limit and the log of the sum of the SIR and the ERL as given in row 80 is 125.49%. Using the equation 5 above the Excess premium is calculated to be equal to $152,968, as shown in row 81.

FIGS. 4A and 4B are an exemplary illustration of worksheets 100 and 120 used in determination of excess limits for a minor insured entity and a major insured entity for various values of SIR. Columns 101-105 of FIG. 4A shows the excess limits of five entities, three minor entities (Minor 1, Minor 2 and Minor 3) and two major entities (Major 1 and Major 2), where one of the minor company is insured. Row 110 of FIG. 4A shows various excess limits for various values of SIR as given in row 112. Similarly, Columns 121-125 of FIG. 4B shows the excess limits of five entities, three minor entities (Minor 1, Minor 2 and Minor 3) and two major entities (Major 1 and Major 2), where one of the major company is insured. Row 130 of FIG. 4B shows various excess limits for various values of SIR as given in row 132.

As can be seen in row 134 of FIG. 4B, the ERL exceeds the loss limit for Minor 1 and Minor 2. To avoid such a situation, in the worksheet used to calculate the total premium of an insured entity (as described in FIG. 5 below), the ERL is limited to the loss limit. This is further discussed below with reference to FIG. 5.

FIG. 5 is an exemplary illustration of a worksheet 200 specifying an interactive model that allows a user to control the SIR and a total premium amount for an insured entity. The model illustrated by FIG. 5 also allows a user to control various retrospective premium factors used in calculating a retrospective premium amount. A user is allowed to input a value for a retrospective base percentage, a retrospective term and a retrospective calibrator. Each of these retrospective premium factors provides a user of the model described in FIG. 5 a different tool for controlling a premium amount used to cover such a retrospective loss. Retrospective premiums are normally based on hundred percentage of the regular premiums of insured entities. The retrospective base percentage allows a user to define what percentage of the regular premium is used to calculate a retrospective premium used to cover the retrospective loss. The retrospective term allows a user to specify how many years a retrospective premium will be applied to pay for the retrospective loss. While the retrospective calibrator allows a user to limit the retrospective premium as a percentage of the regular premium, i.e., the maximum increase in the regular premium that the user would allow to cover the retrospective loss.

In the worksheet 200 columns 202-208 shows the calculation of total premiums for four different entities respectively Minor 1, Minor 2, Major 1 and Major 2. A user can input the revenues of these entities in row 210 and the SIR acceptable for these entities in row 212. Row 214 shows the standard premiums for these entities calculated using the equation 1 above. In row 216, a user can input the maximum loss limit acceptable for these entities. While in FIG. 5, the loss limits are at $25,000,000 for each of the four insured entities, an alternate value can also be input in row 216.

Row 218 shows a retention credit calculated for each of the entities by using the following equation 6:

$$\text{retention\_credit} = -\frac{\log(SIR/a2)}{\log(\text{loss\_limit}/a2)} \quad (6)$$

where retention_credit is the retention credit. Row 220 shows a limit factor which is calculated using the following equation 7:

$$\text{limit\_factor} = 1 + \text{retention\_credit} \quad (7)$$

where limit_factor is the limit factor which is used to calculate the regular premium of the insured entity using the following equation 8:

$$\text{reg\_prem} = \text{std\_prem} * \text{retention\_credit}). \quad (8)$$

Please note that the equation 8 is similar to the equation 2 above. The regular premiums of various insured entities are listed in row 222 in FIG. 5. As mentioned previously in FIG. 4, it is possible to come across a situation where a sum of the SIR and the ERL of an insured entity may be higher than its loss limit. To avoid such situation, in FIG. 5 an adjusted sum of the SIR and the ERL of various entities is calculated using the following equation 9:

$$\begin{aligned}&\text{if } (\text{Round}(\text{reg\_prem}*a1,-6)+\text{SIR}<\text{loss\_limit}) \text{ then}\\&\quad \text{adj\_SIR\_ERL} = \text{Round}(\text{reg\_prem}*a1,-6)+\text{SIR};\\&\text{else adj\_SIR\_ERL} = \text{loss\_limit}\end{aligned} \quad (9)$$

where adj_SIR_ERL is the adjusted value of the sum of the SIR and the ERL and it is listed in row 22 of FIG. 5.

An Adjusted ERL of the insured entities, shown in row 224 is calculated simply by subtracting the SIR from the adjusted sum of the SIR and the ERL 226. Please note that the adjusted ERL of the entities as listed in FIG. 5 is different than the regular ERL listed in FIG. 3 and FIGS. 4A and 4B. Similarly, an adjusted excess limit is also calculated by subtracting the adjusted sum of the SIR and the ERL from the loss limit. The adjusted excess limits for various entities are shown in row 228 of FIG. 5. Again note that the adjusted excess limits as shown in FIG. 5 are different than the regular excess limits shown in FIG. 3 and FIGS. 4A and 4B.

Rows 230-234 allows a user to input the retrospective factors as discussed above, namely the retrospective base percentage, the retrospective term and the retrospective calibrator. Similarly a user can provide a retrospective loss in row 236. Such retrospective loss along with other retrospective factors is used to calculate a retrospective premium which is added to the regular premium of the insured entities. Various steps used in the calculation of the retrospective premium are listed below.

An experience rated loss is calculated based on the value of the retrospective loss and the adjusted value of the sum of the SIR and the ERL using the following equation 10:

$$\begin{aligned}&\text{If}(\text{retrospective\_loss}>\text{adj\_SIR\_ERL}) \text{ then}\\&\quad \text{exp\_rated\_loss} = \text{adj\_SIR\_ERL}; \text{ else}\\&\quad \text{exp\_rated\_loss} = \text{retrospective\_loss}\end{aligned} \quad (10)$$

where retrospective_loss is the retrospective loss specified by a user, and exp_rated_loss is the experience rated loss, the values of such experience rated loss for various insured entities for given values of retrospective losses are listed in row 238.

Next a value of a base retrospective factor is calculated based on the values of the experience rated loss and the adjusted sum of the SIR and the ERL, using the following equation 11:

$$\text{base\_retro\_factor} = \frac{\log(\text{exp\_rated\_loss}/a2)}{\log(\text{adj\_SIR\_ERL}/a2)} \quad (11)$$

where the base_retro_factor is a base retrospective factor, the values of such base retrospective factor for various entities are shown in row 240 of FIG. 5.

Row 242 of FIG. 5 shows values of a loss factor which is calculated using the following equation 12:

$$\text{loss\_factor} = \text{base\_retro\_factor} + \text{retention\_credit} \quad (12)$$

where loss_factor is the loss factor for various insured entities.

Row 244 of FIG. 5 shows values of a retrospective premium factor calculated using the following equation 13:

$$\text{retro\_prem\_factor} = \text{retro\_calibrator} * \frac{(\text{loss\_factor})}{(\text{limit\_factor})} \quad (13)$$

where retro_prem_factor is the retrospective premium factor. Once the retrospective premium factor of various entities is calculated, the retrospective premium of these entities may be determined using the following equation 14:

$$\text{retro\_prem} = \text{reg\_prem} * \text{retro\_base\_percent} * \text{retro\_prem\_factor} \quad (14)$$

where the retro_prem is the retrospective premium of the insured entity and retro_base_percent is the retrospective base percentage provided by a user for the insured entity. The retrospective premiums for various entities are listed in row 246 of FIG. 5. Row 248 of FIG. 5 simply shows the sum of the retrospective premium and the regular premium of the insured entities.

Finally, the adjusted excess premium for the insured entities, based on the sum of the retrospective premium and the regular premium is shown in row 250 of FIG. 5 and it is calculated using the following equation 15:

$$\text{adj\_excess\_prem} = \\ (\text{reg\_prem} + \text{retro\_prem}) * \left(\frac{\log(\text{loss\_limit}/a2)}{\log(\text{adj\_SIR\_ERL}/a2)} - 1\right) \quad (15)$$

where the adj_excess_prem is the adjusted excess premium. A sum of the regular premium, the retrospective premium and the adjusted excess premium is the total premium for the insured entity, which is listed in row 252 of FIG. 5.

The methodology described in FIG. 5 allows a user to control the loss limit and the SIR while including the retrospective premium to account for any retrospective losses. This is a powerful tool that can be used to manage the excess risk of an insured entity based on one or more retrospective losses incurred by the insured entity. The methodology described in FIGS. 1-5 to calculate insurance premium can be used in a number of different industry structures, some of which are described in further detail in FIG. 6 below. Even though only two such structures are described here, it should be understood that many more potential structures can be arranged.

FIG. 6 shows a retention trust approach, also known as the revolving fund approach of risk management. In this approach of risk management, an insured entity establishes a revolving loss fund with a balance equal to or greater than the sum of its SIR and ERL. This arrangement is particularly well suited for governments, hospitals, non-profit organizations, etc. In this arrangement, the insured entity should generally have ample investment funds or easy access to capital market for funds to fund the revolving loss fund. Alternatively the retention trust can take the form of a trust, a captive insurer, a rent-a-captive, a protected cell or a segregated cell type of form.

FIG. 6 shows a flowchart 300 to use the retention trust program in an enterprise risk model in which all the risk is retained by an enterprise managing the retention trust, and no part of risk is transferred to a third party. In such an arrangement the insured corporation acts as a sponsoring entity for the retention trust, for example, by establishing a parent-subsidiary relation between the insured entity and the retention trust. At block 302, The advantage of using an enterprise risk model is that it allows the insured entity to manage, control and budget losses much more effectively than alternate risk management tools available today. Under this arrangement, the insured is in charge of determining the expenses related to insurance risk management. At the same time the retention trust arrangement using enterprise risk model is easy to set up and to make contributions to the retention trust. Since the insured company is a parent of the retention trust, the insured company is also able to manage the retention trusts assets.

Now turning to FIG. 6, at block 302, the insured entity establishes the retention trust, which can be in any one of the forms discussed above, i.e., as a trust, a captive insurer, a rent-a-captive, etc. At block 304, the insured entity sets up a parent-subsidiary relationship with the retention trust. At block 306, the insured entity selects values of a number of control parameters such as the SIR, the retrospective base percent, etc. Based on the values selected at block 306, using the equations 1-15 as described above, at block 308 the insured entity calculates various insurance premiums necessary to manage the insurance risks, such as the regular premium, the excess premium, etc. At block 310 the insured entity makes contributions to the retention trust in the amount of the total premium calculated at block 308. The insured entity should continue making periodic insurance premium payments to the retention trust.

At block 312, the insured entity monitors any losses incurring to the insured entity that may qualify for a reimbursement from the retention trust. If such a loss occurs, at block 314, the insured entity calculated various retrospective insurance premiums using one or more of the equations 1-15. At block 316, the insured entity will pay a retrospective premium to the retention trust. In an enterprise risk model, generally the aggregate limit up to which the retention trust will reimburse the insured entity's losses is the loss limit, or the policy limit. After detection of losses, the insured entity will reevaluate various insurance premiums at block 308 and than continue making periodic insurance premium payments based on new insurance premiums.

If no losses are detected at block 312, at block 314, the insured entity considers whether it needs to reassess the insurance premiums. Generally, such an reassessment should be done at least annually based on new information about revenues, etc. However, alternate reassessment arrangement which is done periodically, etc., may also be set up. If at block 318, the insured entity decides that it needs to do the reassessment, it will recalculate the premiums based on new information at block 306. If no reassessment is necessary, at block 320 the insured entity considers whether it wants to continue the retention trust arrangement. If it decides to continue the relation, it continues making periodic contributions to the retention trust, however, if it is decided that it wants to end the retention trust arrangement, at block 322, the insured entity will dissolve the retention trust.

As previously mentioned, the enterprise risk model is only one type of retention trust arrangement, among many possible retention trust arrangements. Another example of an alternate retention trust arrangement is one using a risk transfer model, in which some risk of loss is transferred from the insured to a third party. In order to minimize a moral hazard on the part of the insured entity, a risk transfer to a third party generally requires that losses be fortuitous or "neither expected from the standpoint of the insured."

The premium calculation mechanics of both the enterprise risk model and the risk transfer model are similar in all respect except with respect to the excess limits, where the enterprise risk model results in excess limits that are unlikely or unnecessary as the losses in the enterprise risk model are one hundred percent experience rated.

FIG. 7 highlights the financial structure of the two different methods of arranging a retention trust program. In FIG. 7 the loss factors have been limited to a maximum of fifty percent for each loss by the retro calibrator.

The Retention trust revolving loss fund models permit the Insured a self directed self funded loss retention program that permits the Insured to transfer virtually any loss within its Experience Rated Limits to its Trust and be able to manage, control and budget loss or expense within its Experience Rated Limits.

The principal disadvantages of Retention Trust models are:
1. Loss Limits are pre-funded to the maximum Experience Rated Limit. In effect, the Insured is prepaying its insurance limit.
2. Trust balances could become deficient if the Trust were to sustain significant losses within a short period of time before the Trust was able to recoup its losses through Regular and Retro premium.
3. Trust balances could become excessive. As the trust is pre-funded for its ERL and most losses are partial and not total, it is quite likely that the Trust could become over-funded if not properly managed by the insured.

Offsetting these considerations.
1. Losses incurred by the Insured or on behalf of the insured should be the Insured's decision as to what funding alternatives are used.
2. The insured can manage and control its trust balances
   A. Income: Although additional retrospective premium is receivable by the trust beginning in the year following the insured's losses, the insured can increase/ decrease the revenue to its trust by changing its retention or the retrospective factors.

B. Assets: In the event the insured's losses result in a significant and immediate loss to its trust, the insured could either advance funds to its trust or authorize its trust to borrow against its premiums receivable.

(A.1) ENTERPRISE RISK MODEL
(A.2) RISK TRANSFER MODEL
(A.3) INTEGRATED RISK TRANSFER MODEL
CONTROL OF RISK

The retrospective base (percentage of regular premium to which retrospective premium factors are applied) is one of the most powerful risk control tools available particularly when used in conjunction with the retro indicator which indicates the RETRO BASE needed to breakeven with future premiums with past incurred losses and current expenses.

Another arrangement between an insurer and an insured is referred to as an investment contract (also known as a banking excess program) is described as follows.

An insurer can enter into a profitable risk controlled investment contract and an Insured can secure enterprise risk coverage by entering into a "Banking Excess" agreement with a commercial insurer.

The principal features of this form of investment contract are:

1. Insured enters into a long term contract with the insurer in which the insured agrees to pay its regular premium and any retrospective premium for its incurred losses to the insurer as well as any excess premium for limits in excess of its ERL.
2. Insurer agrees to indemnify the insured for subject losses in accordance with its policy terms and conditions subject to an "all years aggregate" limitation in the event of contract cancellation by the insured as well as forfeiture of any premium deposit.
3. Insured's capital requirement is either significantly reduced compared to the retention trust models or even eliminated but the tradeoff for the insured is higher expenses or lower investment income or both.
4. Insurer has an opportunity to earn both an underwriting profit and investment income under a long term investment contract in which the risk element is largely under the control of the insurer by prospective underwriting such as revenue weighting and management of all of the RETRO Factors including the retrospective base, retrospective term and retrospective calibrator for the maximum percentage premium increase for a limit loss.
5. The high profit potential and low risk prospects of such an investment contract make this an exceptionally attractive candidate for an insurer's risk capital and an early prospect for commercial development.

A comparison of a Banking Excess Model with a Retention Trust Model based on a 10 year simulation indicates:

1st: The insured's loss experience is exceptionally adverse and is used solely for illustration purposes.
2nd: An insured with a loss experience as adverse as illustrated would have limited options in maintaining a conventional insurance program and cancellation in the face of significant and recurring underwriting deficits would be virtually inevitable.
3rd: The "INEXCHANGE®" model's retrospective indicator provides a basis for adjusting the retrospective base to assure profitable underwriting and is incorporated in the following summary comparison in FIG. 8, which uses the retrospective indicator for year 1.0 to adjust the retrospective base.

FIG. 8 shows a 10 year summary comparison of retention trust and a banking excess program for a single insured entity.

FIGS. 9A and 9B shows a comparison matrix of various risk management methods described above.

Figure 10A:
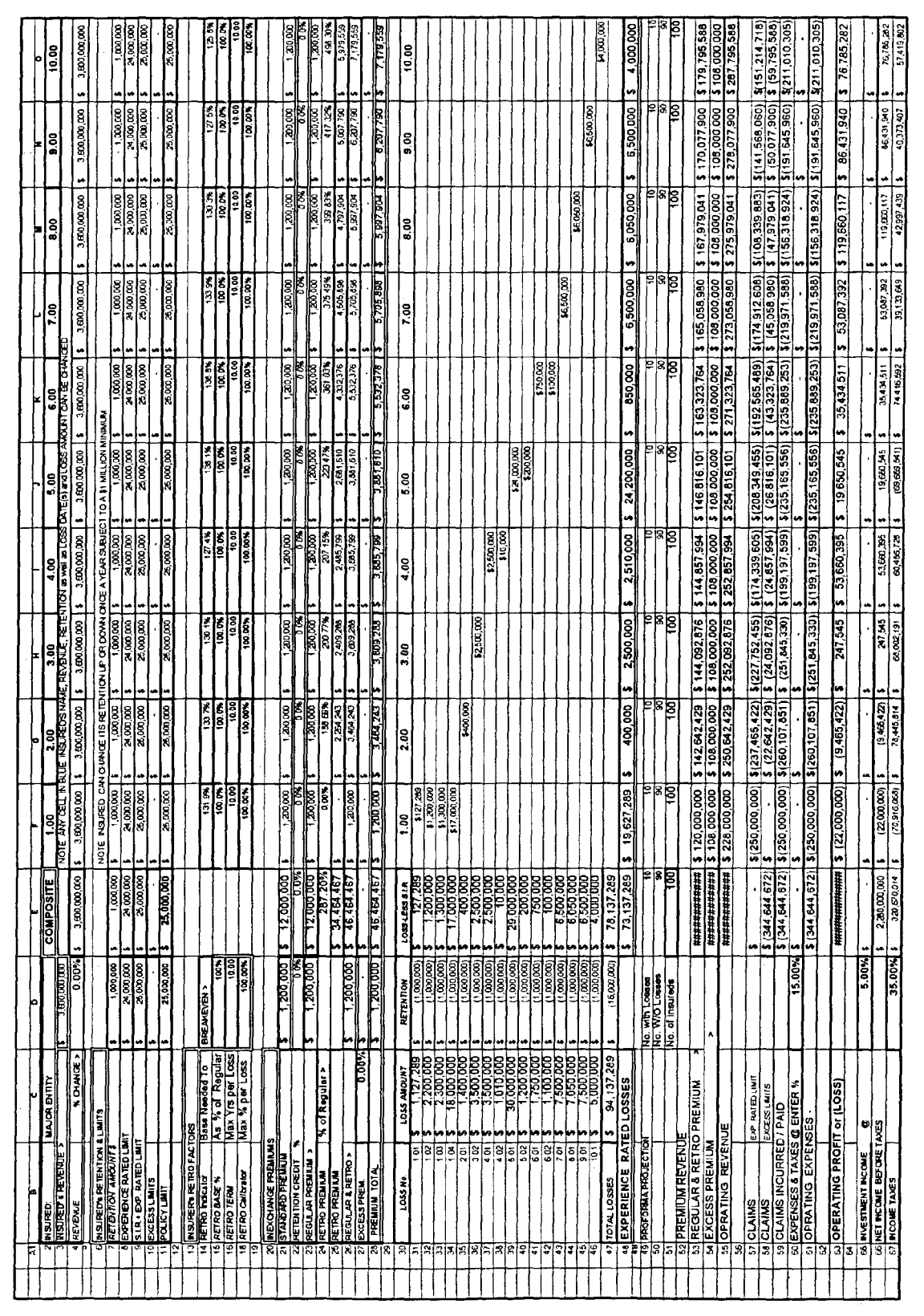
Figure 10B:
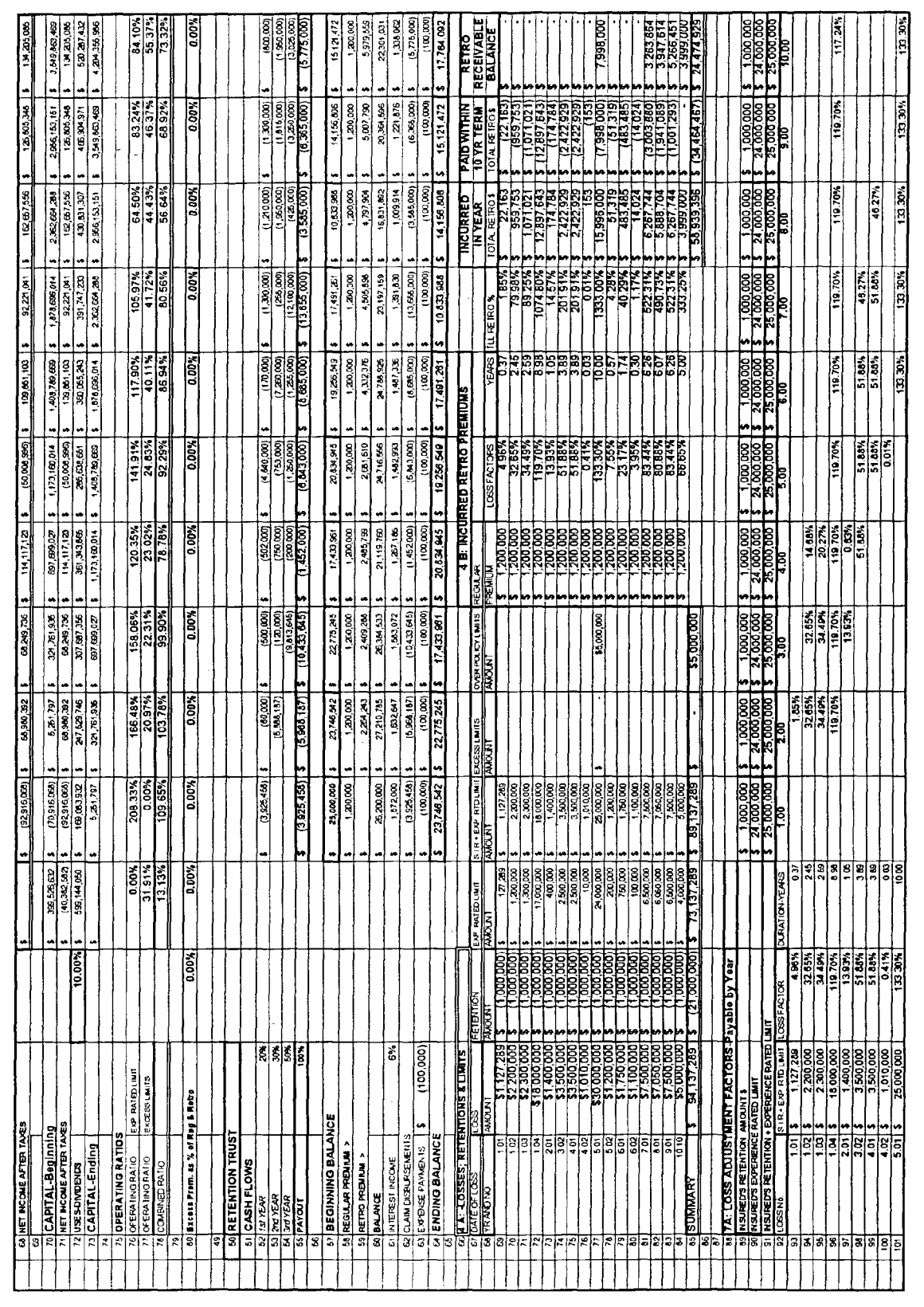
Figure 10C:
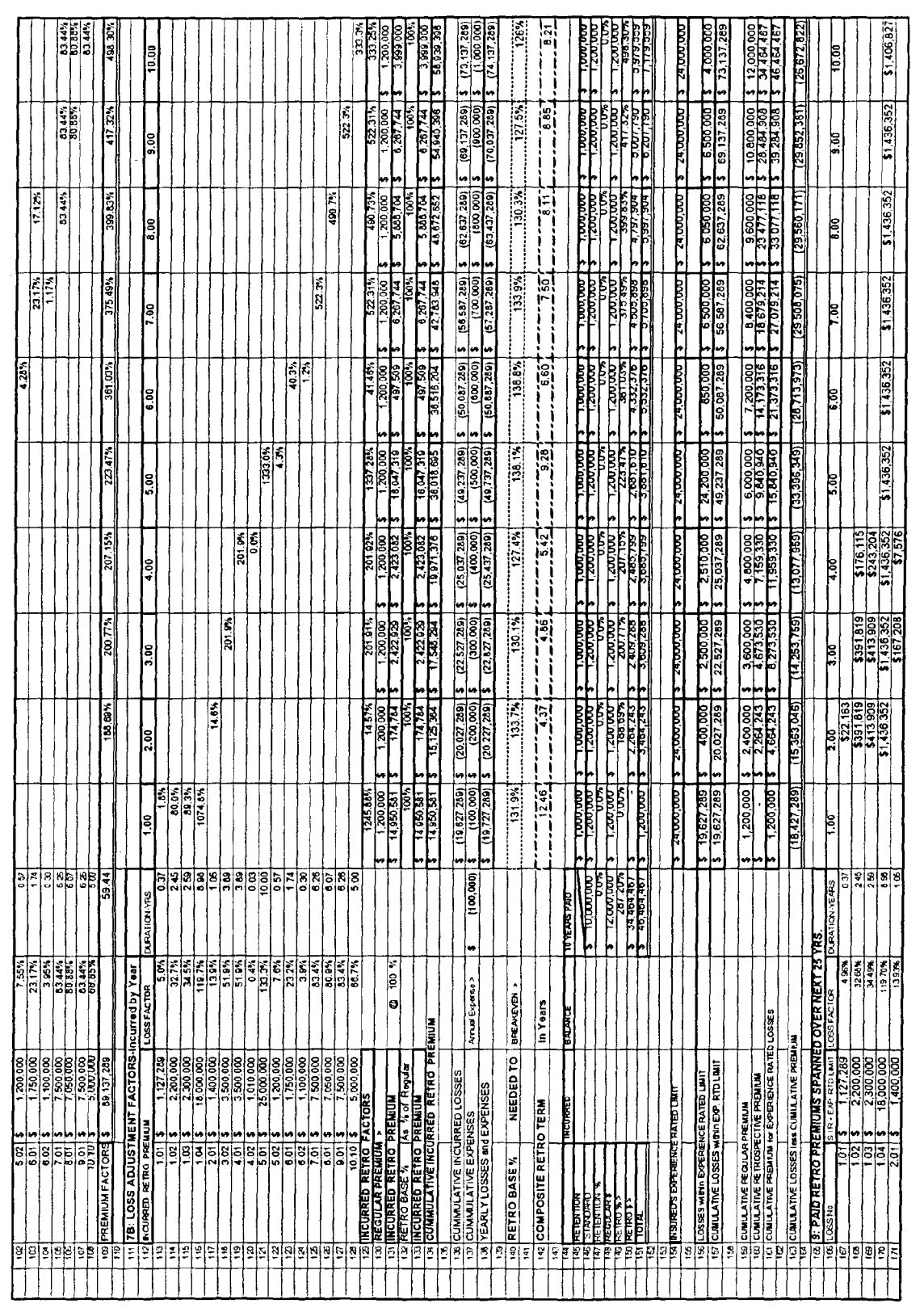

FIGS. 10A-10D shows results of a simulation of the risk management methods described above using a retention trust approach.

In the foregoing specification the present patent has been described with reference to specific embodiments. However, one of ordinary skill in the art will appreciate that various modifications and changes can be made to these embodiments without departing from the scope of the present patent as set forth in the claims below. Accordingly, the specification and figures are to be regarded in an illustrative rather than in a restrictive sense, and all such modifications are intended to be included within the scope of the present patent.

What is claimed is:

1. A computer-readable medium including computer-executable instructions stored thereon for causing a computer to perform a method of calculating an insurance premium for an organization, the method comprising:

receiving a set of insurance information from a user including a revenue of the organization, a self insured retention (SIR) of the organization, and a loss limit acceptable to the organization;

determining a standard premium based on the revenue of the organization;

determining a regular premium based on the standard premium and the SIR of the organization;

determining an experience rated limit based on the regular premium; and determining an excess premium based on the loss limit acceptable to the organization, the regular premium and the SIR of the organization;

wherein determining the standard premium includes:

receiving a revenue weighting factor from the user;

multiplying an actual revenue of the organization by the revenue weighting factor to get a weighted revenue of the organization; and determining the standard premium by using the equation:

$$\text{std\_prem} = a1 * \sqrt{\text{weighted\_revenue}}$$

where std_prem is the standard premium, a1 is a first constant representing a limit to premium multiplier, and weighted_revenue is the weighted revenue of the organization.

2. A computer-readable medium including computer-executable instructions stored thereon for causing a computer to perform a method of as described in claim 1, wherein the limit to premium multiplier has an approximate value of 20.

3. A computer-readable medium including computer-executable instructions stored thereon for causing a computer to perform a method of calculating an insurance premium for an organization, the method comprising:

receiving a set of insurance information from a user including a revenue of the organization, a self insured retention (SIR) of the organization, and a loss limit acceptable to the organization;

determining a standard premium based on the revenue of the organization;

determining a regular premium based on the standard premium and the SIR of the organization;

determining an experience rated limit based on the regular premium; and determining an excess premium based on the loss limit acceptable to the organization, the regular premium and the SIR of the organization, wherein the standard premium and the revenue of the organization are related by the equation:

$$\text{std\_prem} = a1 * \sqrt{\text{revenue}}$$

where std_prem is the standard premium, and
revenue is the revenue of the organization;
the regular premium and the standard premium are related by the equation:

$$\text{reg\_prem} \equiv \text{std\_prem} * \left( \frac{(1 - \log(SIR/a2))}{\log(\text{loss\_limit}/a2)} \right)$$

where reg_prem is the regular premium,
loss_limit is the loss limit acceptable to the organization, and
a2 is a second constant with a value of 1,000,000 used to convert a value in dollars into a value in millions of dollars;
the experience rated limit and the regular premium are related by the equation:

$$\text{exp\_rated\_limit} = a1 * \text{reg\_prem}$$

where exp_rated_limit is the experience rated limit; and
the excess premium, the regular premium, the loss limit and the SIR are related by the equation:

$$\text{ex\_prem} \equiv (\text{reg\_prem}) * \left( \frac{\log(\text{loss\_limit}/a2)}{\log(\text{exp\_rated\_limit}/a2)} - a3 \right)$$

where ex_prem is the excess premium, and
a3 is a third constant with a value of 1.

4. A computer-readable medium including computer-executable instructions stored thereon for causing a computer to perform a method of as described in claim 3, further including determining a necessary revenue for an organization to generate a targeted standard premium, where the necessary revenue and the targeted standard premium are related by the equation:

$$\text{necessary\_revenue} = (\text{target\_std\_prem}^2/a4)$$

where necessary_revenue is the necessary revenue for the organization,
target_std_premium is the targeted standard premium, and
a 4 is a fourth constant with an approximate value of 400.

5. A computer-readable medium including computer-executable instructions stored thereon for causing a computer to perform a method of claim 3, further comprising:
determining an excess limit, where the excess limit, the experience rated limit and the loss limit are related by the equation:

$$\text{excess\_limit} = \text{loss\_limit} - (SIR + \text{exp\_rated\_limit})$$

where excess_limit is the excess limit.

6. A computer-readable medium including computer-executable instructions stored thereon for causing a computer to perform a method of claim 3, further comprising:
receiving a first retrospective loss for the organization;
receiving a set of retrospective factors to determine a first retrospective premium based at least in part on the first retrospective loss, said retrospective factors including a retrospective base percentage specifying a percentage of the regular premium used to calculate the first retrospective premium, a retrospective term specifying a number of years that the first retrospective premium is to be applied, and a retrospective calibrator specifying a maximum increase in the regular premium due to the first retrospective premium; and
determining the first retrospective premium.

7. A computer-readable medium including computer-executable instructions stored thereon for causing a computer to perform a method of claim 6 wherein, determining the first retrospective premium comprising:

(1) determining a retention debit, where the retention debit, the loss limit and the SIR are related by the equation:

$$\text{retention\_debit} = \frac{\log(SIR/a2)}{\log(\text{loss\_limit}/a2)}$$

where retention_debit is the retention debit;
(2) determining a limit factor, where the limit factor and the retention debit are related by the equation:

$$\text{limit\_factor} = a3 - \text{retention\_debit}$$

where limit_factor is the limit factor;
(3) determining an adjusted sum of the SIR and the experience rated limit (adj_SIR_ERL), where if the sum of the experience rated limit and the SIR is less than the loss limit, the adj_SIR_ERL equals the sum of the experience rated limit and the SIR, otherwise the maximum loss limit equals the loss limit;
(4) determining an experience rated loss, where if the first retrospective loss is greater than the adj_SIR_ERL, the experience rated loss equals the adj_SIR_ERL, otherwise the experience rated loss equals the first retrospective loss;
(5) determining a base retrospective factor, where the base retrospective factor, the experience rated loss and the maximum loss limit are related by the equation:

$$\text{base\_retro\_factor} = \frac{\log(\text{exp\_rated\_loss}/a2)}{\log(\text{adj\_SIR\_ERL}/a2)}$$

where base_retro_factor is the base retrospective factor, and
exp_rated_loss is the experience rated loss;
(6) determining a loss factor, where the loss factor, the base retrospective factor and the retention debit are related by:

$$\text{loss\_factor} = \text{base\_retro\_factor} - \text{retention\_debit}$$

where loss_factor is the loss factor;
(7) determining a retrospective premium factor, where the retrospective premium factor, the retrospective calibrator, the loss factor and the limit factor are related by the equation:

$$\text{retro\_prem\_factor} = (\text{retro\_calibrator}) * \left( \frac{\text{loss\_factor}}{\text{limit\_factor}} \right)$$

where retro_prem_factor is the retrospective premium factor,
retro_calibrator is the retrospective calibrator; and (8) determining the retrospective premium, where the retrospective premium, the regular premium and the retrospective base percentage are related by the equation:

$$retro\_premium = reg\_prem * retro\_base\_percent * retro\_prem\_factor$$

where retro_prem is the retrospective premium, and retro_base_percent is the retrospective base percentage.

8. A computer-readable medium including computer-executable instructions stored thereon for causing a computer to perform a method of claim 7 further comprising:

determining an adjusted excess premium, where the adjusted excess premium, the regular premium, the retroactive premium, the loss limit and the adj_SIR_ERL are related by the following relation:

$$adj\_excess\_prem = (reg\_prem + retro\_premium) * \left( \frac{\log(loss\_limit/a2)}{\log(adj\_SIR\_ERL/a2)} - a3 \right)$$

where, adj_excess_prem is the adjusted excess premium.

9. A computer-readable medium including computer-executable instructions stored thereon for causing a computer to perform a method of claim 8 further comprising:

determining a total premium of an organization as a sum of the regular premium, the adjusted excess premium and the retrospective premium.

10. A computer-readable medium including computer-executable instructions stored thereon for causing a computer to perform a method of claim 9 further including:

setting up a retention trust with a balance equal to or greater than the sum of the experience rated limit and the SIR;
the retention trust providing a first type of insurance to the organization; and
the organization making periodic payments to the retention trust in an amount equal to the total premium.

11. A computer-readable medium including computer-executable instructions stored thereon for causing a computer to perform a method of claim 10, wherein the retention trust is setup in a corporate form similar to one of a trust, a captive insurer, a rent-a-captive insurer, a protected cell insurer and a segregated cell insurer.

12. A computer-readable medium including computer-executable instructions stored thereon for causing a computer to perform a method of claim 11, wherein the retention trust is set up as a controlled entity that is financially not consolidated with the organization.

13. A computer-readable medium including computer-executable instructions stored thereon for causing a computer to perform a method of claim 9, wherein the organization enters into a contract to pay the total insurance premium to a third party insurer and the third party insurer indemnifies the organization for a plurality of losses for a first period as specified in the contract.

14. A system for determining an insurance premium of an organization employing a processor, a memory, a display, and an input mechanism, the system comprising a program stored on the memory and executable on the processor to:

receive a set of insurance information from a user including a revenue of the organization, a self insured retention (SIR) of the organization, and a loss limit acceptable to the organization;
determine a standard premium based on the revenue of the organization;
determine a regular premium based on the standard premium and the SIR of the organization;
determine an experience rated limit based on the regular premium; and
determine an excess premium based on the loss limit acceptable to the organization, the regular premium and the SIR of the organization;
wherein to determine the standard premium, the program stored on the memory is executable by the processor to:
receive a revenue weighting factor from the user;
multiply an actual revenue of the organization by the revenue weighting factor to get a weighted revenue of the organization; and
determine the standard premium by using the equation:

$$std\_prem = a1 * \sqrt{weighted\_revenue}$$

where std_prem is the standard premium,
a1 is a first constant representing a limit to premium multiplier, and
weighted_revenue is the weighted revenue of the organization.

15. A system for determining an insurance premium of an organization comprising:
a processor;
a memory;
an input mechanism adapted to receive a set of insurance information from a user including a revenue of the organization, a self insured retention (SIR) of the organization, and a loss limit acceptable to the organization;
a computer program stored on the memory and adapted to execute on the processor to determine a standard premium based on the revenue of the organization, determine a regular premium based on the standard premium and the SIR of the organization, determine an experience rated limit based on the regular premium, to determine an excess premium based on the loss limit acceptable to the organization, the regular premium and the SIR of the organization, wherein to determine the standard premium, the program stored on the memory is executable by the processor to:
receive a revenue weighting factor from the user; to multiply an actual revenue of the organization by the revenue weighting factor to get a weighted revenue of the organization; and to determine the standard premium by using the equation:

$$std\_prem = a1 * \sqrt{weighted\_revenue}$$

where std_prem is the standard premium,
a1 is a first constant representing a limit to premium multiplier, and
weighted_revenue is the weighted revenue of the organization; and
an output device adapted to output the standard premium and the excess premium to the user on a user readable medium.

16. A computer program embodied on at least one computer readable medium including computer-executable instructions comprising:
first software for receiving a set of insurance information from a user including a revenue of the organization, a self insured retention (SIR) of the organization, and a loss limit acceptable to the organization;
second software for determining a standard premium based on the revenue of the organization;
third software for determining a regular premium based on the standard premium and the SIR of the organization;
fourth software for determining an experience rated limit based on the regular premium;

fifth software for determining an excess premium based on the loss limit acceptable to the organization, the regular premium and the SIR of the organization;

sixth software to receive a revenue weighting factor from the user;

seventh software to multiply an actual revenue of the organization by the revenue weighting factor to get a weighted revenue of the organization; and eighth software to determine the standard premium by using the equation:

$$std\_prem = a1 * \sqrt{weighted\_revenue}$$

where std_prem is the standard premium, a1 is a first constant representing a limit to premium multiplier, and weighted_revenue is the weighted revenue of the organization, wherein the first, second, third, fourth, fifth, sixth, seventh and eighth software are recorded on the computer readable medium.

* * * * *